(12) United States Patent
Ito

(10) Patent No.: US 8,466,971 B2
(45) Date of Patent: Jun. 18, 2013

(54) IMAGE PROCESSING APPARATUS AND IMAGE PROCESSING METHOD

(75) Inventor: Yasuhiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 13/104,463

(22) Filed: May 10, 2011

(65) Prior Publication Data

US 2011/0292254 A1 Dec. 1, 2011

(30) Foreign Application Priority Data

Jun. 1, 2010 (JP) .................................. 2010-126292
Mar. 18, 2011 (JP) .................................. 2011-061345

(51) Int. Cl.
*H04N 5/228* (2006.01)
*H04N 3/14* (2006.01)
*G03B 17/00* (2006.01)

(52) U.S. Cl.
USPC ........................... 348/208.6; 348/296; 396/55

(58) Field of Classification Search
USPC ......... 348/208.6, 208.4, 208.12, 296; 396/52, 396/55
See application file for complete search history.

(56) References Cited

U.S. PATENT DOCUMENTS

| | | | |
|---|---|---|---|
| 7,580,620 B2 * | 8/2009 | Raskar et al. .................... 396/55 |
| 7,639,289 B2 * | 12/2009 | Agrawal et al. ................ 348/239 |
| 7,756,407 B2 * | 7/2010 | Raskar ............................ 396/55 |
| 8,223,259 B2 * | 7/2012 | Veeraraghavan et al. ...... 348/367 |
| 8,237,804 B2 * | 8/2012 | Torii ........................... 348/208.4 |
| 8,289,405 B2 * | 10/2012 | Tsutsumi .................... 348/208.6 |
| 8,379,097 B2 * | 2/2013 | Torii ........................... 348/208.4 |
| 8,390,704 B2 * | 3/2013 | Wang et al. .................... 348/248 |
| 8,405,763 B2 * | 3/2013 | Veeraraghavan et al. ...... 348/367 |
| 2007/0258706 A1 | 11/2007 | Raskar et al. |
| 2008/0062287 A1 * | 3/2008 | Agrawal et al. ................ 348/241 |
| 2010/0182440 A1 * | 7/2010 | McCloskey ................ 348/208.4 |
| 2010/0295953 A1 * | 11/2010 | Torii et al. .................. 348/208.4 |
| 2010/0295954 A1 * | 11/2010 | Kotani ........................ 348/208.4 |
| 2010/0321509 A1 * | 12/2010 | Torii ........................... 348/208.4 |
| 2010/0321539 A1 | 12/2010 | Ito |
| 2011/0050920 A1 * | 3/2011 | Siddiqui et al. ............. 348/208.6 |
| 2011/0075020 A1 * | 3/2011 | Veeraraghavan et al. ...... 348/367 |
| 2011/0096995 A1 | 4/2011 | Ito |
| 2011/0129166 A1 * | 6/2011 | Nishiyama ..................... 382/263 |
| 2012/0033096 A1 * | 2/2012 | Jelinek ........................ 348/222.1 |
| 2012/0195520 A1 * | 8/2012 | Ishii ............................... 382/255 |
| 2012/0262589 A1 * | 10/2012 | Torii ........................... 348/208.4 |

FOREIGN PATENT DOCUMENTS

| | | |
|---|---|---|
| JP | 2006-074693 A | 3/2006 |
| JP | 2008-310797 A | 12/2008 |

OTHER PUBLICATIONS

Agrawal et al.; "Coded Exposure Deblurring: Optimized Codes for PSF Estimation and Invertibility"; Jan. 2009; IEEE Conference on Computer Vision and Pattern Recognition; pp. 2066-2073.*
Sarker et al.; "Improved Reconstruction of Flutter Shutter Images for Motion Blur Reduction"; Dec. 2010; 2010 International Conference on Digital Image Computer: Techniques and Applications; pp. 417-422.*
Agrawal, A.; "Optimal Single Image Capture for Motion Deblurring"; Jun. 2009; IEEE Conference on Computer Vision and Pattern Recognition; pp. 2560-2567.*

* cited by examiner

*Primary Examiner* — John Villecco
(74) *Attorney, Agent, or Firm* — Fitzpatrick, Cella, Harper & Scinto

(57) ABSTRACT

Sensed image data obtained by controlling opening/closing of a shutter based on a signal for controlling the opening/closing timing of the shutter of an image sensing device is acquired. Exposure characteristic data indicating the exposure characteristic of the image sensing device in unit opening/closing of the shutter is acquired. A motion vector regarding an image represented by the sensed image data when acquiring the sensed image data is acquired. The image represented by the sensed image data is corrected based on the signal for controlling the opening/closing timing of the shutter, the exposure characteristic data, and the motion vector.

6 Claims, 12 Drawing Sheets

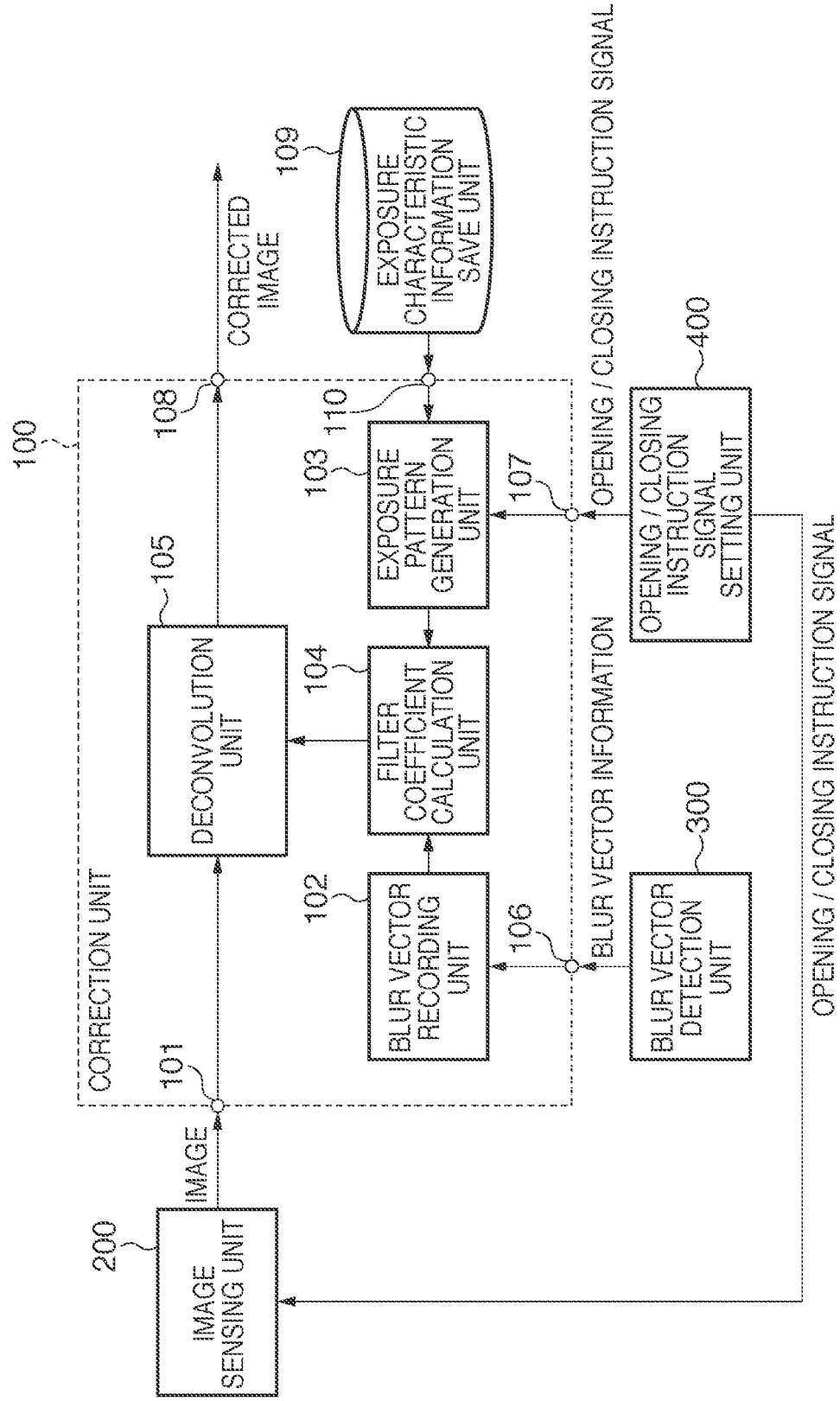

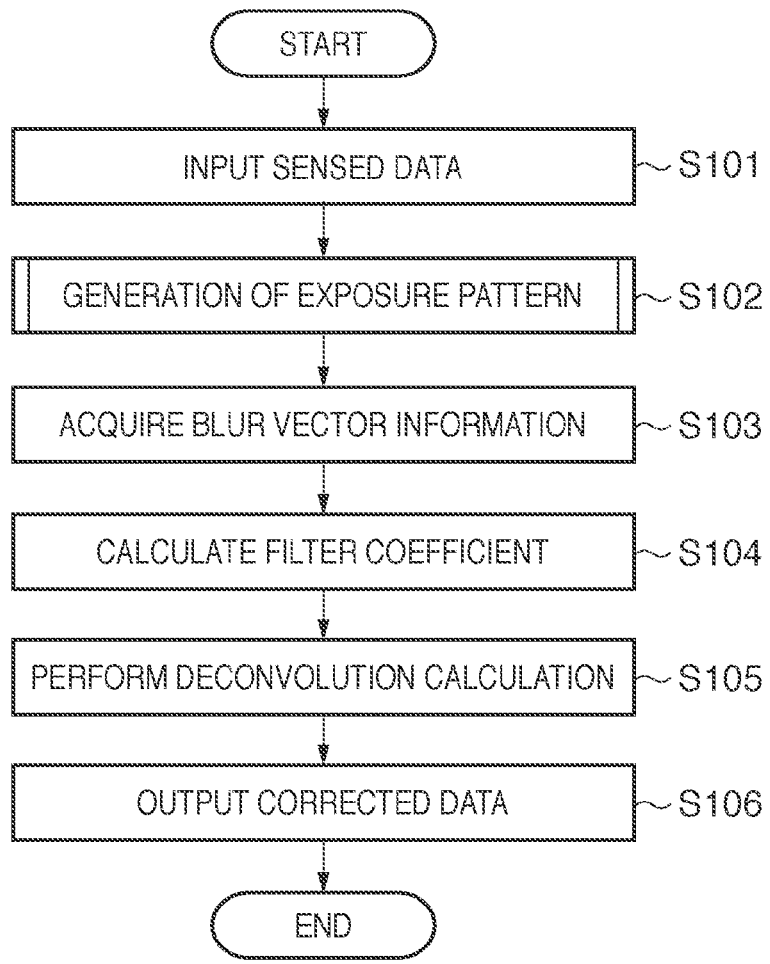
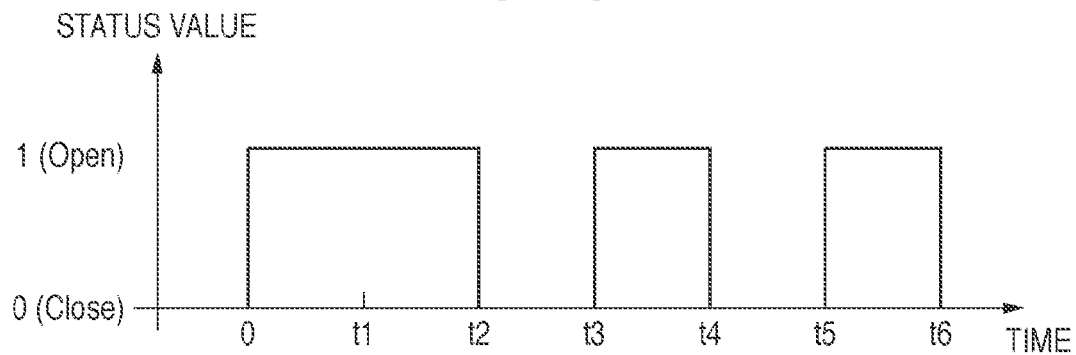

FIG. 10A
C(t) : OPENING / CLOSING INSTRUCTION SIGNAL   [1, 0, 0, 1, 1, 0, 0, 0, 1, 1, 1, 0]
UNIT OPENING / CLOSING 1    UNIT OPENING / CLOSING 2    UNIT OPENING / CLOSING 3
FIG. 10B
| | LENGTH | EXPOSURE CHARACTERISTIC INFORMATION |
|---|---|---|
| UNIT OPENING / CLOSING 1 | 1 | 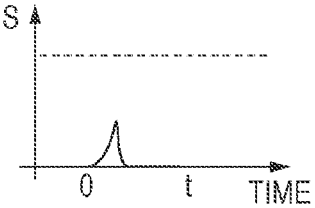 |
| UNIT OPENING / CLOSING 2 | 2 | 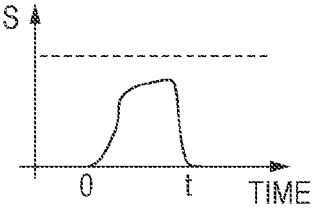 |
| UNIT OPENING / CLOSING 3 | 3 | 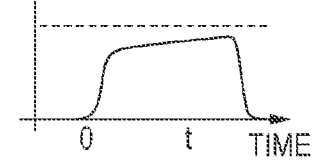 |

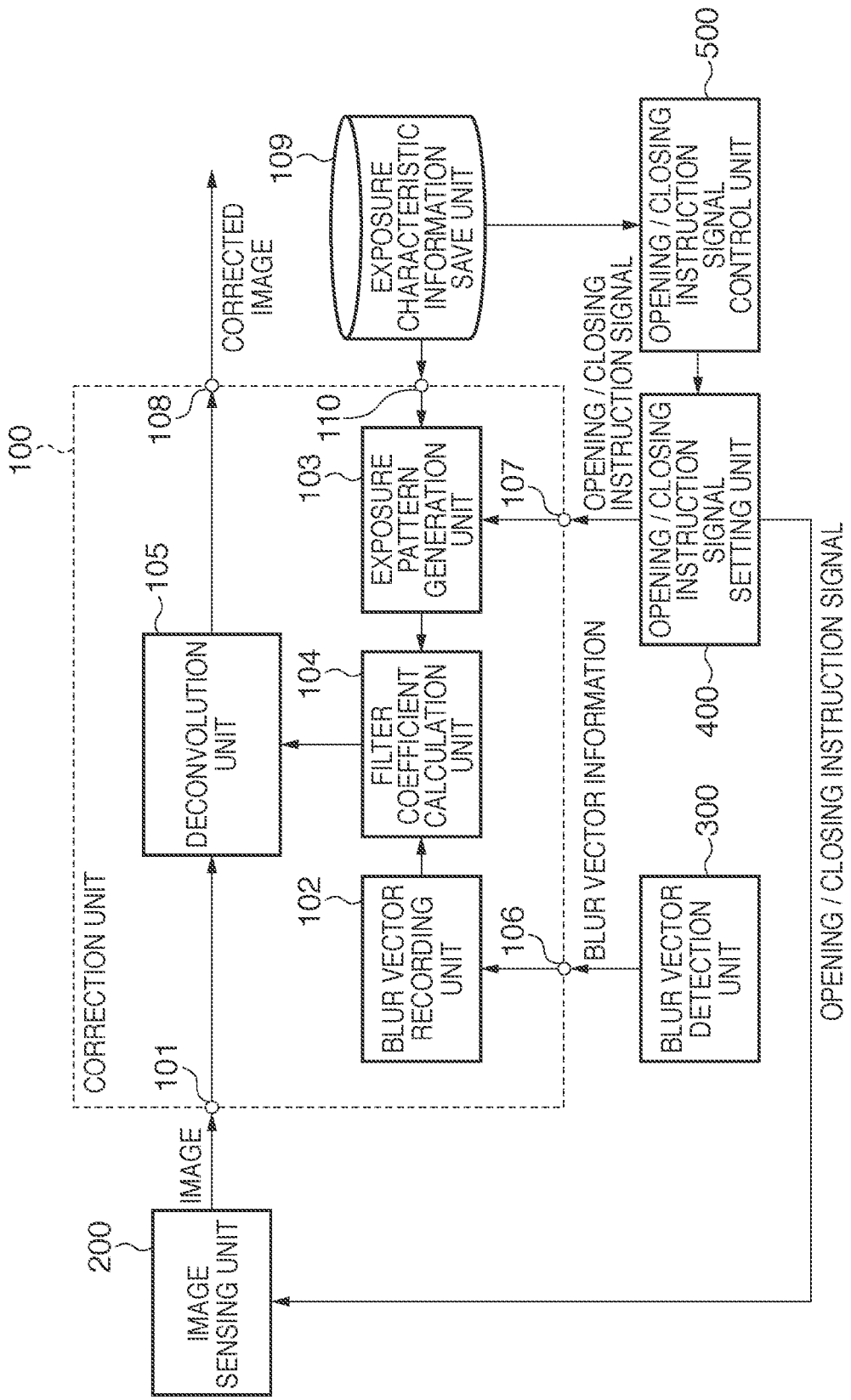

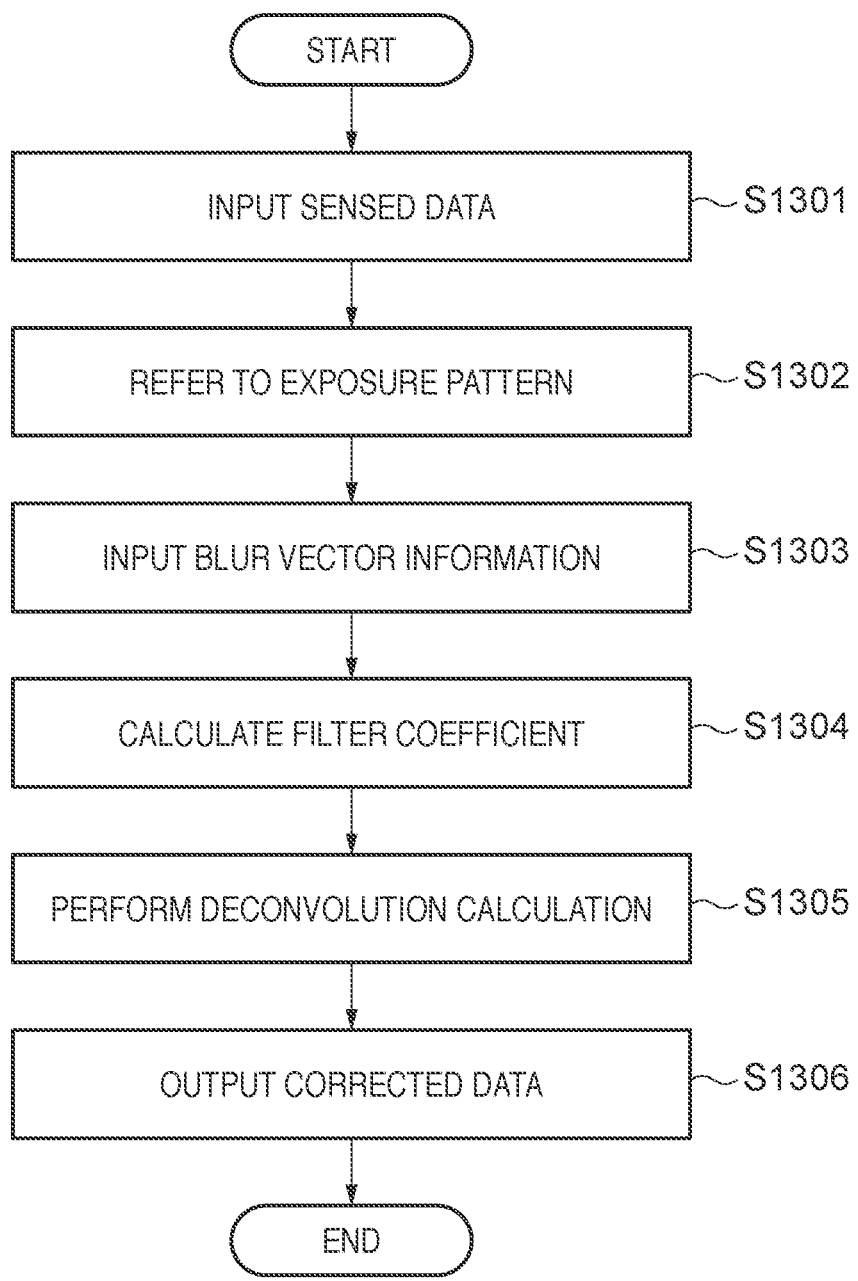

FIG. 14A

| | SHUTTER SPEED | STOP | OPENING / CLOSING INSTRUCTION SIGNAL | EXPOSURE PATTERN INFORMATION |
|---|---|---|---|---|
| 1 | 1/250 [SEC] | F5.6 | [1,1,0,1,0,1] | [0,178,242,252,12,0,0,178,242,252,12,0,0,0,0, 0,0,0,178,242,252,12,0,0,0,0,0,0,0,178,242,252, 12,0] |
| 2 | 1/125 [SEC] | F4.0 | [1,0,1,1,0,1,0, 1,1,1,0,0,1] | [0,178,242,252,12,0,0,0,0,0,0,178,242,252,12, 0,0,178,242,252,12,0,0,0,0,0,0,0,178,242,252, 12,0,0,0,0,0,0,0,178,242,252,12,0,0,178,242, 252,12,0,0,178,242,252,12,0,0,0,0,0,0,0,0, 0,0,178,242,252,12,0] |
| ⋮ | ⋮ | ⋮ | ⋮ | ⋮ |
| n | 1/25 [SEC] | F11 | [0,1,1,1,0,1,1,0,0, 1,1,0,0,1,1,1,1,0,1, 0,1,0,1,1,0,0,0,1] | [0,0,0,0,0,0,178,242,252,12,0,0,178,242,252, 12,0,0,178,242,252,12,0,0,0,0,0,0,0,178,242, 252,12,0,0,178,242,252,12,0,0,0,0,0,0,0,0, 0,0,0,178,242,252,12,0,0,178,242,252,12,0,0,0, 0,0,0,0,0,0,0,0,178,242,252,12,0,0,178, 242,252,12,0,0,178,242,252,12,0,0,178,242, 252,12,0,0,0,0,0,0,0,178,242,252,12,0,0,0, 0,0,0,178,242,252,12,0,0,0,0,0,0,0,178,242, 252,12,0,0,178,242,252,12,0,0,0,0,0,0,0,0, 0,0,0,0,0,0,0,0,178,242,252,12,0] |

FIG. 14B

| | SHUTTER SPEED | STOP | OPENING / CLOSING INSTRUCTION SIGNAL | EXPOSURE PATTERN INFORMATION |
|---|---|---|---|---|
| 1 | 1/250 [SEC] | F5.6 | [1,1,0,1,0,1] | [0,178,242,252,253,85,31,178,242,252,253,253, 0,0,0,0,0,0,178,242,252,253,253,0,0,0,0,0,178, 242,252,253,253] |
| 2 | 1/125 [SEC] | F4.0 | [1,0,0,1,1,1,0, 1,1,1,0,0,1] | [0,178,242,252,253,253,0,0,0,0,0,0,0,0,0,0, 178,242,252,253,85,31,178,242,252,253,85,31, 178,242,252,253,253,0,0,0,0,0,0,178,242,252, 253,85,31,178,242,252,253,85,31,178,242,252, 253,253,0,0,0,0,0,0,0,0,0,0,178,242,252, 253,253] |
| ⋮ | ⋮ | ⋮ | ⋮ | ⋮ |
| n | 1/25 [SEC] | F11 | [0,1,0,1,0,1,1,0,1, 1,1,0,0,1,1,1,1,0,1, 0,1,0,1,1,0,1,0,1] | [0,0,0,0,0,0,178,242,252,253,253,0,0,0,0,0, 0,178,242,252,253,253,0,0,0,0,0,0,178,242, 252,253,85,31,178,242,252,253,0,0,0,0,0,0, 178,242,252,253,85,31,178,242,252,253, 85,31,178,242,252,253,253,0,0,0,0,0,0,0,0, 0,0,0,178,242,252,253,85,31,178,242,252,253, 85,31,178,242,252,253,85,31,178,242,252,253, 253,0,0,0,0,0,0,178,242,252,253,253,0,0,0,0, 0,0,178,242,252,253,253,0,0,0,0,0,0,0,178, 242,253,85,31,178,242,252,253,253,0,0,0,0, 0,0,178,242,252,253,253,0,0,0,0,0,0,178,242, 252,253,253,0,0,0,0,0,0,178,242,252,253,253] |

IMAGE PROCESSING APPARATUS AND IMAGE PROCESSING METHOD

BACKGROUND OF THE INVENTION

1. Field of the Invention

The present invention relates to a camera shake correction technique.

2. Description of the Related Art

A recent increase in the quality and zooming ratio of an image sensing device has posed a problem of blur of a sensed image caused by camera shake upon image sensing, and conventionally led to wide use of image sensing devices with a camera shake correction function. Such an image sensing device with a camera shake correction function generally adopts an optical camera shake correction method of optically correcting a camera shake using a gyro sensor configured to detect an angular velocity dependent on a camera shake and a driving device configured to control the relative positions of the lens and image sensor so as to cancel the camera shake.

A method of correcting a camera shake by image processing is also under study. As a method of correcting a camera shake for one blurred image, it is known to interpret the process of image degradation caused by a camera shake as convolution using a filter, calculate a filter based on the camera shake speed, and remove the influence of camera shake by deconvolution (patent literature 1 (US-2007-0258706)).

In general, the frequency characteristic of the blur filter has a property of becoming 0 at a given frequency. This results in a problem of losing information about the frequency at which the frequency characteristic becomes 0. To solve this, there is proposed a technique of opening/closing a shutter at random at the time of exposure when one image is acquired, and correcting a camera shake or object blur by arithmetic processing using the shutter opening/closing information (patent literature 2 (Japanese Patent Laid-Open No. 2008-310797)). This technique is called coded exposure. A pattern used to open/close the shutter at random in exposure is called a coded exposure pattern. In patent literature 2, blur correction is implemented using a satisfactory coded exposure pattern to prevent the frequency characteristic of the blur filter from becoming 0.

The techniques disclosed in the patent literatures cited as examples use a rectangular wave for the coded exposure pattern when executing coded exposure. However, an image sensor mounted in a general digital camera adopts photoelectric conversion, and generates an electrical signal from light entering the image sensor. Hence, a signal is not output in the form of a rectangular wave from an actual image sensor and has a time lag. If this signal is regarded as a rectangular wave output and blur correction calculation is done, a blur-corrected image degrades.

SUMMARY OF THE INVENTION

The present invention has been made in consideration of the above-described problems, and provides a technique for correcting a blur at high precision from a camera shake-generated image.

According to the first aspect of the present invention, there is provided an image processing apparatus comprising: a first acquisition unit configured to acquire sensed image data obtained by controlling opening/closing of a shutter based on a signal for controlling an opening/closing timing of the shutter of an image sensing device; a second acquisition unit configured to acquire exposure characteristic data indicating an exposure characteristic of the image sensing device in unit opening/closing of the shutter; a third acquisition unit configured to acquire a motion vector regarding an image represented by the sensed image data when acquiring the sensed image data; and a correction unit configured to correct the image represented by the sensed image data based on the signal for controlling the opening/closing timing of the shutter, the exposure characteristic data, and the motion vector.

According to the second aspect of the present invention, there is provided an image processing apparatus comprising: a first acquisition unit configured to acquire sensed image data obtained by controlling opening/closing of a shutter based on a signal for controlling an opening/closing timing of the shutter of an image sensing device; a second acquisition unit configured to acquire exposure characteristic data indicating an exposure characteristic in a plurality of opening/closing operations of the shutter; a third acquisition unit configured to acquire a motion vector regarding an image represented by the sensed image data when acquiring the sensed image data; and a correction unit configured to correct the image represented by the sensed image data based on the signal for controlling the opening/closing timing of the shutter, the exposure characteristic data, and the motion vector.

According to the third aspect of the present invention, there is provided an image processing method comprising: a first acquisition step of acquiring sensed image data obtained by controlling opening/closing of a shutter based on a signal for controlling an opening/closing timing of the shutter of an image sensing device; a second acquisition step of acquiring exposure characteristic data indicating an exposure characteristic of the image sensing device in unit opening/closing of the shutter; a third acquisition step of acquiring a motion vector regarding an image represented by the sensed image data when acquiring the sensed image data; and a correction step of correcting the image represented by the sensed image data based on the signal for controlling the opening/closing timing of the shutter, the exposure characteristic data, and the motion vector.

According to the fourth aspect of the present invention, there is provided an image processing method comprising: a first acquisition step of acquiring sensed image data obtained by controlling opening/closing of a shutter based on a signal for controlling an opening/closing timing of the shutter of an image sensing device; a second acquisition step of acquiring exposure characteristic data indicating an exposure characteristic in a plurality of opening/closing operations of the shutter; a third acquisition step of acquiring a motion vector regarding an image represented by the sensed image data when acquiring the sensed image data; and a correction step of correcting the image represented by the sensed image data based on the signal for controlling the opening/closing timing of the shutter, the exposure characteristic data, and the motion vector.

Further features of the present invention will become apparent from the following description of exemplary embodiments with reference to the attached drawings.

BRIEF DESCRIPTION OF THE DRAWINGS

FIG. 1 is a block diagram exemplifying the functional arrangement of a correction unit 100;

FIG. 2 is a flowchart showing processing performed by the correction unit 100;

FIG. 3 is a graph showing an opening/closing instruction signal;

FIGS. 10A and 10B are views exemplifying unit opening/closing, and the structure of information held in an exposure characteristic information save unit 109;

FIG. 11 is a block diagram exemplifying the functional arrangement of a correction unit 100;

FIG. 13 is a flowchart showing processing performed by the correction unit 100; and FIGS. 14A and 14B are tables exemplifying save of an exposure pattern.

DESCRIPTION OF THE EMBODIMENTS

Figure 4:
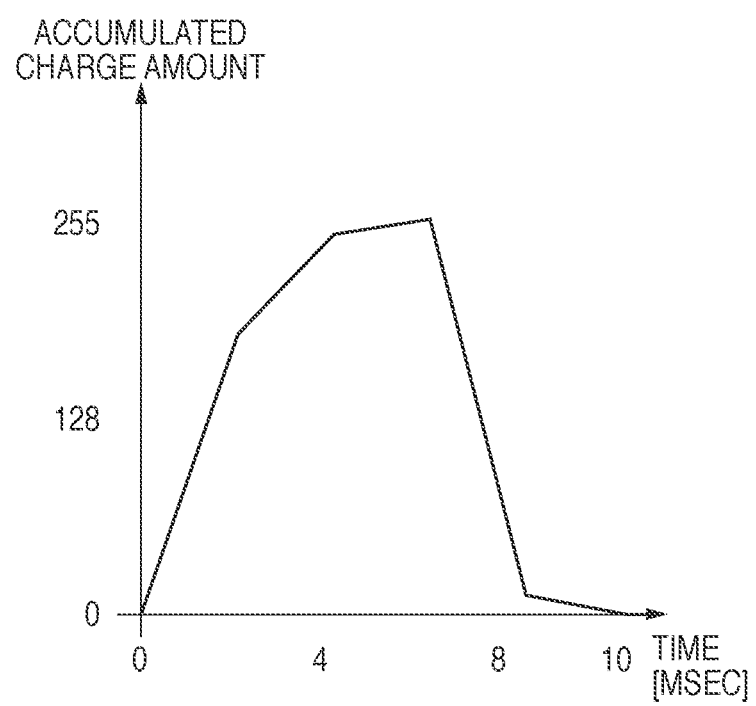
FIG. 4 is a graph showing exposure characteristic information.

Embodiments of the present invention will now be described with reference to the accompanying drawings. Each of the following embodiments is an example of concretely practicing the present invention, and is one detailed example of arrangements defined in the scope of claims.

First Embodiment

Arrangement of Image Sensing Device According to First Embodiment

The first embodiment will describe an image sensing device which performs blur correction processing for one image. In the first embodiment, a description of the camera shake is restricted to the case of a shift blur (translation blur).

The functional arrangement of a correction unit 100 in the image sensing device according to the first embodiment will be exemplified with reference to FIG. 1. As described above, the correction unit 100 executes processing for correcting a camera shake as a shift blur from one image.

An input terminal 101 receives data (sensed data) of an image sensed by an image sensing unit 200. The image sensing unit 200 includes an image sensor formed from image sensing elements, an optical system, a shutter, and an A/D converter. The image sensing unit 200 senses one image by performing an image sensing operation to open/close the shutter (or optical shutter) a plurality of number of times within the exposure time to sense one image. The shutter is opened/closed in accordance with a shutter opening/closing pattern indicated by an opening/closing instruction signal sent from an opening/closing instruction signal setting unit 400 on a subsequent stage. The image sensing unit 200 inputs, to a deconvolution unit 105 on a subsequent stage via the input terminal 101, image data obtained by performing this image sensing operation.

A blur vector detection unit 300 is formed from a general gyro sensor or the like. The blur vector detection unit 300 measures (detects) the direction and amount of an image sensing device blur or object blur at every specific timing within the exposure time. The blur vector detection unit 300 sends, to a blur vector recording unit 102 via an input terminal 106, blur vector information (blur vector data) indicating the direction and amount of a blur detected at every specific timing. The blur vector recording unit 102 records the blur vector information input from the blur vector detection unit 300 via the input terminal 106.

When the exposure time is divided into periods each having a specific length, the opening/closing instruction signal setting unit 400 sends an opening/closing instruction signal to the image sensing unit 200 to instruct it whether to open or close the shutter in each specific-length period. The opening/closing instruction signal setting unit 400 sends this opening/closing instruction signal even to an exposure pattern generation unit 103 via an input terminal 107. The opening/closing instruction signal is time series data (first time series data) indicating a shutter opening/closing pattern in the exposure time. More specifically, the opening/closing instruction signal is time series data obtained by arranging "status values each indicating whether the shutter is open or closed" in the time series order for respective specific-length periods in the exposure time. Assume that a status value indicating an open state is "1", and a status value indicating a closed state is "0".

Upon receiving the opening/closing instruction signal, the image sensing unit 200 refers to the status value of each specific-length period in the opening/closing instruction signal. If the status value for the current period T is "1", the image sensing unit 200 controls the shutter to the open state in the current period T. If the status value for the current period T is "0", the image sensing unit 200 controls the shutter to the closed state in the current period T. In this fashion, the image sensing unit 200 controls opening/closing of the shutter during each period in the exposure time in accordance with the opening/closing instruction signal.

An exposure characteristic information save unit 109 stores time series data (second time series data) measured in advance as exposure characteristic information. The second time series data is time series data of accumulated charge amounts in the image sensor that are measured in advance at respective specific timings during the sum of a period till saturation of charges after the start of accumulating charges in the image sensor and a period till the completion of sending charges after the start of sending saturated charges. Details of the exposure characteristic information will be described later.

The exposure pattern generation unit 103 acquires the exposure characteristic information from the exposure characteristic information save unit 109 via an input terminal 110 (third acquisition). Further, the exposure pattern generation unit 103 acquires even the opening/closing instruction signal (first time series data) sent from the opening/closing instruction signal setting unit 400 (second acquisition). By using the acquired first time series data and second time series data, the exposure pattern generation unit 103 generates an exposure pattern indicating an incident light quantity from an object at each specific timing within the exposure time. Details of the exposure pattern and its generation method will be described later.

By using the blur vector information recorded by the blur vector recording unit 102 and the exposure pattern generated by the exposure pattern generation unit 103, a filter coefficient calculation unit 104 calculates filter coefficients which form a filter used for blur correction.

The deconvolution unit 105 acquires image data input via the input terminal 101 (first acquisition). The deconvolution unit 105 generates blur-corrected image data by performing deconvolution processing for the acquired image data based on a filter using filter coefficients calculated by the filter coefficient calculation unit 104. The image data blur-corrected by the deconvolution unit 105 is output as a "corrected image" via an output terminal 108 to the memory or display device of the image sensing device according to the embodiment.

<Processing Performed by Correction Unit 100>

Processing performed by the correction unit 100 will be explained with reference to FIG. 2. In step S101, the deconvolution unit 105 acquires data (sensed data) of one image sensed by the above-described image sensing operation.

In step S102, the exposure pattern generation unit 103 generates an exposure pattern using exposure characteristic information acquired from the exposure characteristic information save unit 109 and an opening/closing instruction signal acquired from the opening/closing instruction signal setting unit 400. Details of the processing in step S102 will be described with reference to the flowchart of FIG. 5.

In step S103, the blur vector recording unit 102 acquires, from the blur vector detection unit 300 via the input terminal 106, blur vector information indicating the direction and amount of a blur in the image sensing device at each specific timing within the exposure time when the image acquired in step S101 was sensed. The blur vector recording unit 102 then records the acquired blur vector information.

In step S104, the filter coefficient calculation unit 104 calculates blur correction filter coefficients using the blur vector information recorded by the blur vector recording unit 102 and the exposure pattern generated by the exposure pattern generation unit 103.

In step S105, the deconvolution unit 105 performs, for the image data acquired in step S101, deconvolution processing based on a filter using the filter coefficients which have been calculated by the filter coefficient calculation unit 104 in step S104. By the deconvolution processing, blur-corrected image data is generated.

In step S106, the deconvolution unit 105 outputs the blur-corrected image data via the output terminal 108 to the memory or display device of the image sensing device according to the embodiment.

<Opening/closing Instruction Signal>

The opening/closing instruction signal will be explained. As shown in FIG. 3, the opening/closing instruction signal indicates a shutter opening/closing pattern in the exposure time (0 to t6 in FIG. 3). In FIG. 3, the abscissa indicates the time, and the ordinate indicates a "status value indicating whether the shutter is open or closed". As described above, a status value indicating that the shutter is open (Open) is "1", and a status value indicating that the shutter is closed (Close) is "0". The shutter opening/closing control is executed in every unit time (specific-length period). For $n \geq 0$ and $t_0=0$, the unit time is given by $(t_{n+1}-t_n)$.

In FIG. 3, the status value is "1" during periods between 0 and t2, between t3 and t4, and between t5 and t6. During these periods, the shutter is open. That is, during these periods, the shutter is open to sense an image. To the contrary, the status value is "0" during periods between t2 and t3 and between t4 and t5. During these periods, the shutter is closed. That is, during these periods, the shutter is closed to sense an image.

Letting t be a variable indicating a specific-length period (index for each specific-length period), an opening/closing instruction signal C(t) shown in FIG. 3 is C(t)=[1, 1, 0, 1, 0, 1]. In this case, t is an integer which satisfies $1 \leq t \leq 6$. That is, the value of the opening/closing instruction signal C(1) in the first specific-length period (t=1), that is, the period between 0 and t1 is "1". The value of the opening/closing instruction signal C(2) in the second specific-length period (t=2), that is, the period between t1 and t2 is "1". The value of the opening/closing instruction signal C(3) in the third specific-length period (t=3), that is, the period between t2 and t3 is "0". The value of the opening/closing instruction signal C(4) in the fourth specific-length period (t=4), that is, the period between t3 and t4 is "1". The value of the opening/closing instruction signal C(5) in the fifth specific-length period (t=5), that is, the period between t4 and t5 is "0". The value of the opening/closing instruction signal C(6) in the sixth specific-length period (t=6), that is, the period between t5 and t6 is "1".

<Exposure Characteristic Information>

The exposure characteristic information will be described. In the first embodiment, the exposure characteristic information is a numerical representation of the charge accumulation characteristic of the image sensor, as described above. For example, assume that the time (accumulation time) till saturation of charges after the start of accumulating charges in the image sensor is 6 msec, and the time (sending time) till the completion of sending saturated charges after sending them (until the accumulated charge amount in the image sensor becomes almost 0) is 4 msec. In this case, the exposure characteristic information of the image sensor can be represented as shown in FIG. 4. In FIG. 4, the abscissa indicates the time, and the ordinate indicates the accumulated charge amount. The accumulated charge amount is a maximum of 255 and a minimum of 0. However, the exposure characteristic information is essentially the same even when the maximum value of the accumulated charge amount is a numerical value other than 255. The division number of the charge amount may not be an integer.

Since the accumulation time is 6 msec, the sending time is 4 msec, and the greatest common divisor of 6 and 4 is 2, an accumulated charge amount in every 2 msec is used as exposure characteristic information S in the embodiment. In FIG. 4, [0, 178, 242, 252, 12, 0] is used as the exposure characteristic information S. From the exposure characteristic information in FIG. 4, an accumulated charge amount at the start of charge accumulation in the image sensor is 0, an accumulated charge amount 2 msec after the start of accumulation is 178, and an accumulated charge amount 4 msec after the start of accumulation is 242. Also, an accumulated charge amount 6 msec after the start of accumulation is 252, an accumulated charge amount 8 msec after the start of accumulation is 12, and an accumulated charge amount 10 msec after the start of accumulation is 0.

The numerical value string [0, 178, 242, 252, 12, 0] of accumulated charge amounts exhibits a charge accumulation characteristic. Thus, the exposure characteristic information according to the embodiment also serves as charge accumulation characteristic information.

For descriptive convenience, the numerical value string of accumulated charge amounts in every time which is the greatest common divisor of the accumulation time and sending time is defined as the exposure characteristic information. However, the numerical value string of accumulated charge amounts in an arbitrary time may be set as the exposure characteristic information. It is desirable to define, as the exposure characteristic information, the numerical value string of accumulated charge amounts in every time out of the greatest common divisor of the accumulation time and sending time, a shorter one of the accumulation time and sending time, and a time shorter than a shorter one of the accumulation time and sending time.

<Operation of Exposure Pattern Generation Unit 103>

Figure 5:
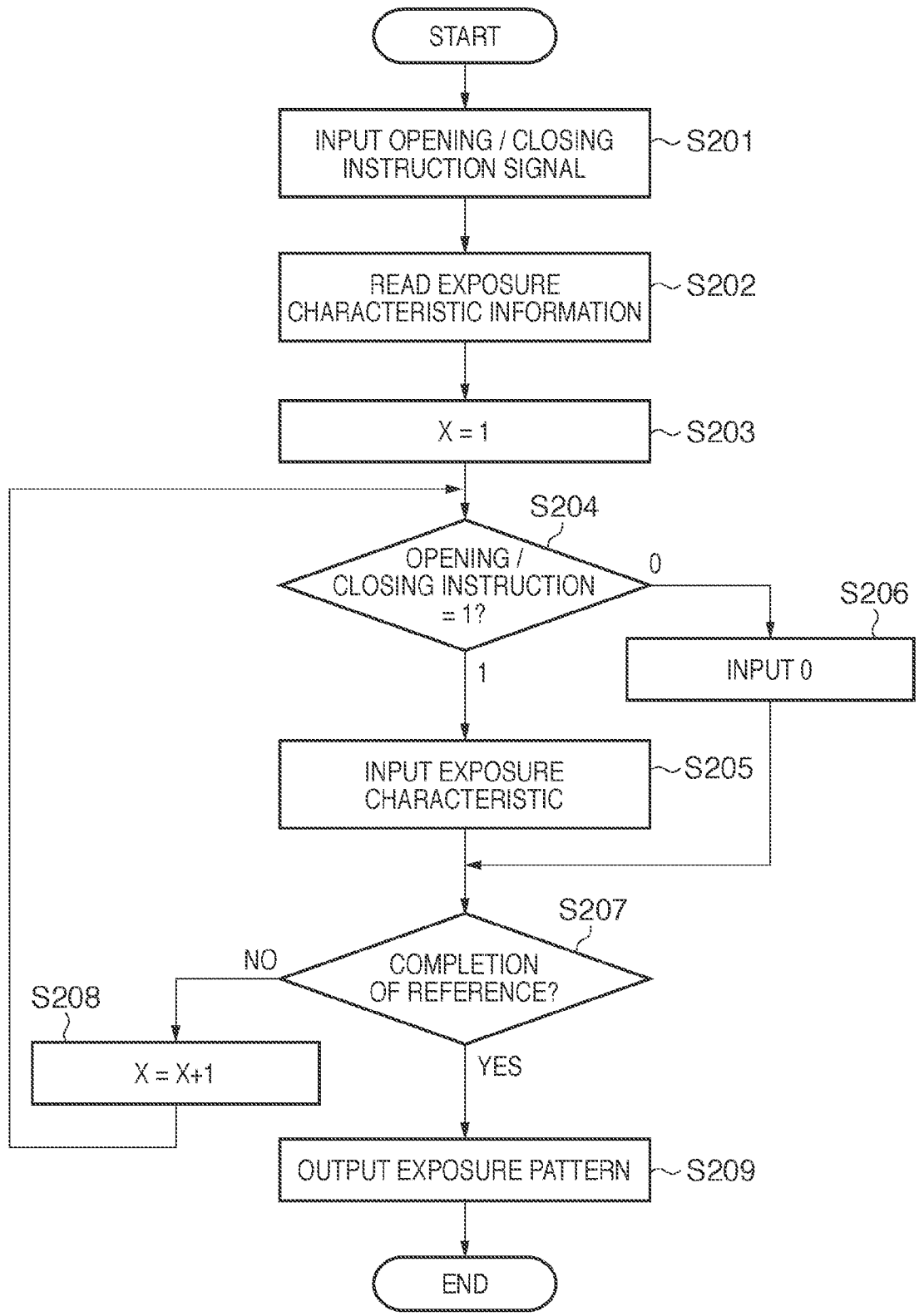
FIG. 5 is a flowchart for explaining the operation of an exposure pattern generation unit 103.

The operation of the exposure pattern generation unit 103 will be explained with reference to the flowchart of FIG. 5. First, the exposure pattern generation unit 103 acquires the opening/closing instruction signal C(t) from the opening/closing instruction signal setting unit 400. In step S202, the exposure pattern generation unit 103 acquires the exposure characteristic information S from the exposure characteristic information save unit 109.

In step S203, the exposure pattern generation unit 103 initializes, to 1, a variable x for use in the following processing. In step S204, the exposure pattern generation unit 103 checks whether the opening/closing instruction signal C(x), that is, the xth status value in the time series order in the first time series data is 1. If the opening/closing instruction signal C(x) is 1 as a result of the check, the process advances to step S205; if it is 0, to step S206.

In step S205, the exposure pattern generation unit 103 determines the exposure characteristic information S as a data string corresponding to the opening/closing instruction signal C(x). The exposure pattern generation unit 103 adds the determined data string to the end of an exposure pattern serving as a one-dimensional data string. As a matter of course, when the processing in this step is executed for the first time, the exposure pattern is the specified data string itself.

In step S206, the exposure pattern generation unit 103 determines, as the data string corresponding to the opening/closing instruction signal C(x), 0s equal in number to elements (six elements in the above example) contained in the exposure characteristic information S (elements in the second time series data). The exposure pattern generation unit 103 adds the determined data string to the end of the exposure pattern. Needless to say, when the processing in this step is executed for the first time, the exposure pattern is the specified data string itself.

Figure 6:
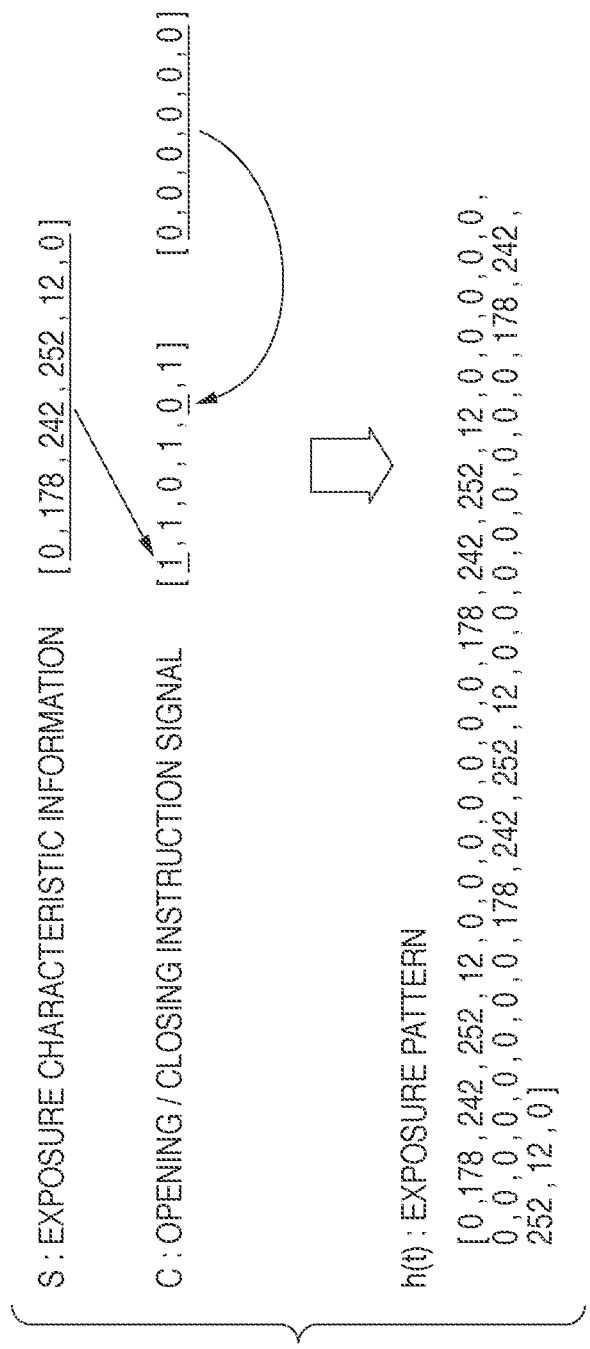
FIG. 6 is a view for explaining a concrete exposure pattern generation method.

For example, assume that the opening/closing instruction signal C(t)=[1, 1, 0, 1, 0, 1] and the exposure characteristic information S=[0, 178, 242, 252, 12, 0], as shown in FIG. 6. In this case, since C(1)=1, a data string corresponding to C(1) is the exposure characteristic information S. Hence, the exposure pattern h(1)=0, h(2)=178, h(3)=242, h(4)=252, h(5)=12, and h(6)=0. Since C(5)=0, a data string corresponding to C(5) is [0, 0, 0, 0, 0, 0]. Thus, the exposure pattern h(25)=h(26)=h(27)=h(28)=h(29)=h(30)=0.

In step S207, the exposure pattern generation unit 103 determines data strings corresponding to all status values in the opening/closing instruction signal. The exposure pattern generation unit 103 then determines whether the determined data strings have been added to the end of the exposure pattern. If the exposure pattern generation unit 103 determines that the data strings corresponding to all status values have been additionally registered in the exposure pattern, the process advances to step S209. If the exposure pattern generation unit 103 determines that the data strings corresponding to all status values in the opening/closing instruction signal have not been additionally registered in the exposure pattern, the process advances to step S208. In step S208, the exposure pattern generation unit 103 increments the value of the variable x by one, and the process advances to step S204.

In this fashion, status values in the opening/closing instruction signal (first time series data) are referred to in the time series order, data strings corresponding to the referred status values are determined, and determined data strings are arranged in the data string determination order, obtaining time series data. This time series data is determined as an exposure pattern. In step S209, the exposure pattern generation unit 103 sends the completed exposure pattern to the filter coefficient calculation unit 104.

For the opening/closing instruction signal C(t)=[1, 1, 0, 1, 0, 1] and the exposure characteristic information S=[0, 178, 242, 252, 12, 0], the above calculation yields an exposure pattern h(t), as shown in FIG. 6:

h(t)=[0, 178, 242, 252, 12, 0,
 0, 178, 242, 252, 12, 0,
 0, 0, 0, 0, 0, 0,
 0, 178, 242, 252, 12, 0,
 0, 0, 0, 0, 0, 0,
 0, 178, 242, 252, 12, 0]

When each building element of the exposure pattern h(t) is represented by a value of a binary value (0,1) or larger, it is necessary to normalize and then output the pixel value of each pixel which forms an image obtained by the deconvolution unit 105 using the exposure pattern h(t). For example, when each building element of the exposure pattern h(t) is represented by a value of 0 to 255, as described above, the deconvolution unit 105 needs to divide, by 255, the pixel value of each pixel which forms an image having undergone blur correction based on the exposure pattern h(t), and then output the resultant pixel value.

<Operation of Filter Coefficient Calculation Unit 104>

The operation principle of the filter coefficient calculation unit 104 will be explained. As for the shift blur motion, letting t be time, s(t) be the shift blur vector of the image sensing device at time t, and x(t) be a two-dimensional vector indicating the position of the image sensing device at time t, the following equation is established:

$$x(t)=x(0)+s(t) \tag{1}$$

In this case, the shooting start time t is 0. I is a blur-free image at time t=0. I(m) is a pixel value at a coordinate point (coordinate vector) m in the image I. From equation (1), the coordinate vector m(0) at time t=0 for a "pixel positioned at the coordinate point m in the image at time t" is m(0)=m−s(t). Assume that both the x and y components of the coordinate vector m are integers. That is, the coordinate vector m is a vector indicating the coordinate value of a grid point. A pixel value contributing to a coordinate position indicated by the coordinate vector m is the integral value of pixel values I(m−s(t)) from time t=0 up to exposure time T. Thus, the shift blur can be given by the following equation:

$$I_{blur}(m) = \frac{1}{T}\int_0^T h(t)I(m-s(t))dt \tag{2}$$

where h(t) is the above-mentioned exposure pattern h(t), and $I_{blur}$ is an image blurred due to the shift motion. In equation (2), the filter K is defined by $$K(m) \equiv \frac{1}{T}\int_0^T h(t)(m-s(t))dt \tag{3}$$

In this fashion, calculation according to equation (3) is executed using the blur vector s(t) and exposure pattern h(t) of the image sensing device, obtaining a filter coefficient to be applied to a pixel at the coordinate point m. Equation (3) represents processing of integrating the product of a position where the blur vector s(t) is subtracted from the coordinate vector m and the exposure pattern h(t) for the time t from 0 to exposure time T. As a result, each filter coefficient which forms the filter K can be obtained. In this case, equation (2) can be rewritten into $$I_{blur}(m) = \sum_{n \in Z/NZ \times Z/MZ} I(n)K(m-n) \quad (4)$$

For descriptive convenience, the first embodiment describes only the magnitude of a shift blur vector which coincides with a grid point. However, blur correction calculation is possible even for a shift blur vector which does not coincide with a grid point. For example, the method described in patent literature 2 is also available. Although a one-dimensional vector has been described for simplicity, the above description applies even to a two-dimensional vector (image). In this case, it suffices to replace one-dimensional vectors with two-dimensional vectors in the flowchart of FIG. 5 such that m is replaced with (m, n), x is replaced with (x, y), and s(t) is replaced with (s_x(t), s_y(t)).

<Method of Generating Opening/Closing Instruction Signal C(t)>

A method of generating the opening/closing instruction signal C(t) will be described. The rectangular wave shape (shape of 0 and 1) of the opening/closing instruction signal C(t) is generated to prevent the filter K determined by equation (3) from falling to 0. The zero fall will be explained in short. The zero fall means a case in which when the filter K is Fourier-transformed, the frequency characteristic after the Fourier transform falls to 0 at a specific frequency. If the zero fall occurs, information about the frequency at which the frequency characteristic becomes 0 is lost from the image when the deconvolution unit 105 executes inverse Fourier transform. A blurred image from which the information is lost cannot be corrected normally.

Figure 7A:
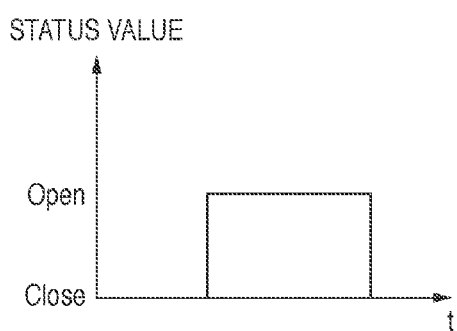
FIGS. 7A to 7F are graphs showing the opening/closing instruction signal and the frequency characteristic of a filter K.
Figure 7B:
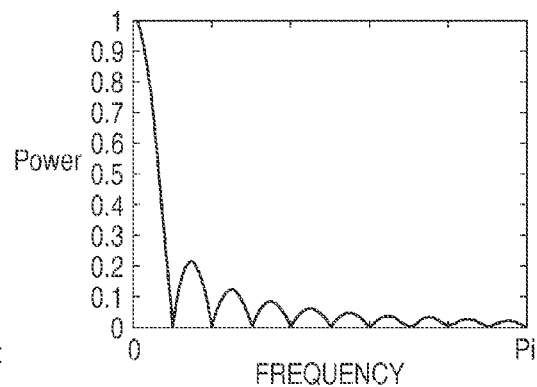

For example, a uniform motion in the lateral direction will be examined. Assume that the kinetic rate corresponds to 20 pixels in conversion into a sensed image during one image sensing. FIG. 7A shows a normal opening/closing instruction signal C(t) at this time. This signal represents that the shutter is opened for a predetermined time and then closed. The abscissa indicates the time, and the ordinate indicates the C(t) value. FIG. 7B shows an example in which a filter K equal in size to the sensed image is calculated based on the opening/closing instruction signal C(t) and its frequency characteristic is obtained. In FIG. 7B, the abscissa indicates the frequency, and the ordinate indicates the absolute value of discrete Fourier transform of the filter K. FIG. 7B shows frequencies at which the frequency characteristic of the filter K becomes 0, and thus the zero fall occurs.

Figure 7C:
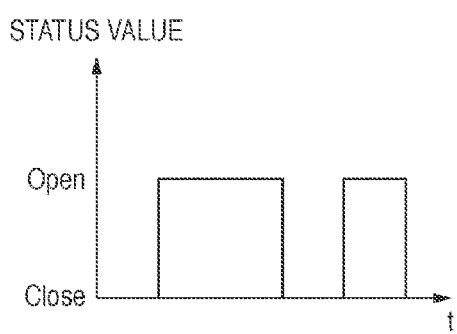
Figure 7D:
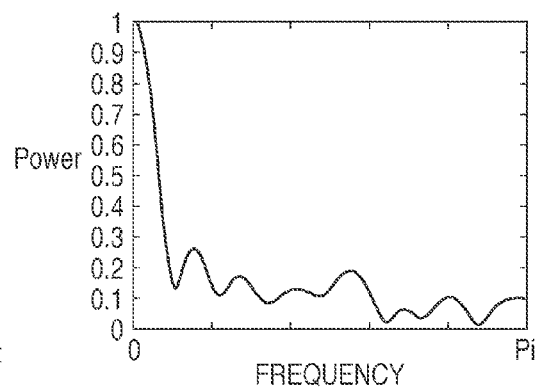

FIG. 7C shows an example in which the opening/closing instruction signal C(t) is controlled using coded exposure to avoid the zero fall. The abscissa and ordinate of this graph have the same meanings as those in FIG. 7A. FIG. 7D shows an example in which a filter K equal in size to the sensed image is calculated based on the opening/closing instruction signal C(t) and its frequency characteristic is obtained. The abscissa and ordinate of this graph have the same meanings as those in FIG. 7B. Controlling the opening/closing instruction signal C(t) can prevent the value of the frequency characteristic of the filter K from becoming 0.

More specifically, the opening/closing instruction signal C(t) is desired to set to maximize the minimum value of the absolute value of discrete Fourier transform of the filter K when the filter K is Fourier-transformed. In addition, for example, the method described in patent literature 2 is also available.

Figure 7E:
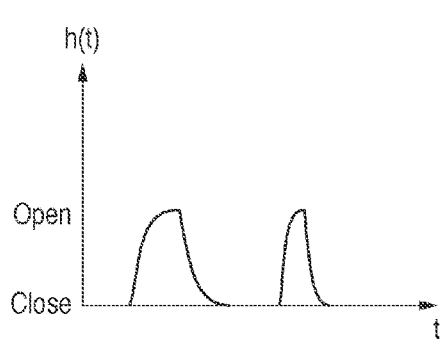
Figure 7F:
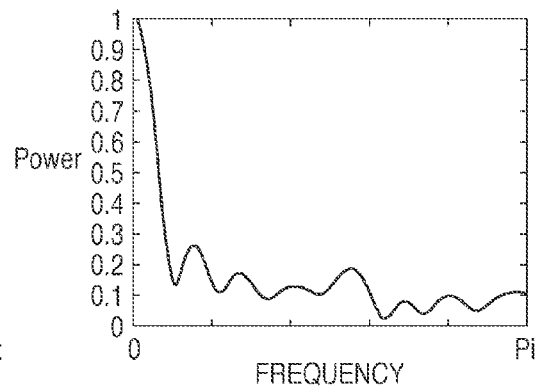

Creation of the exposure pattern h(t) based on the opening/closing instruction signal C(t) is affected by the charge accumulation speed of the sensor of the image sensing device or the shutter opening/closing speed. For this reason, the exposure pattern h(t) in shooting does not become rectangular and has a time lag, as shown in FIG. 7E. The abscissa indicates the time, and the ordinate indicates the h(t) value. In blur correction calculation, therefore, the exposure pattern h(t) is set as shown in FIG. 7E. FIG. 7F shows the frequency characteristic of the filter K in this case. The abscissa and ordinate of this graph have the same meanings as those in FIG. 7B. However, no zero fall occurs, similar to FIG. 7D in which the opening/closing instruction signal C(t) is controlled.

The opening/closing instruction signal setting unit 400 holds such an opening/closing instruction signal in advance, and if necessary, sends it to the image sensing unit 200 and exposure pattern generation unit 103. Needless to say, the opening/closing instruction signal setting unit 400 may generate the opening/closing instruction signal, as needed.

<Exposure Pattern>

As described above, the exposure pattern h(t) is determined based on the opening/closing instruction signal C(t) and exposure characteristic information S in coded exposure. Calculating the filter K using the exposure pattern h(t) enables blur correction. This processing gives attention to the fact that charge accumulation in the image sensor takes time, as described above. When the exposure pattern h(t) is created using only the opening/closing instruction signal without considering the difference in exposure characteristic, even if a blurred image shown in FIG. 8A is corrected using the exposure pattern h(t), normal blur correction of the image fails as shown in FIG. 8B.

Figure 8A:
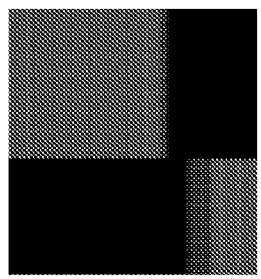
FIGS. 8A to 8C are views exemplifying images before and after blur correction.
Figure 8B:
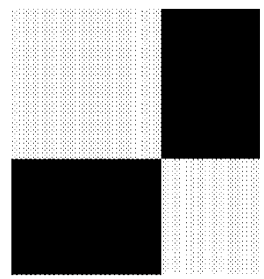
Figure 8C:
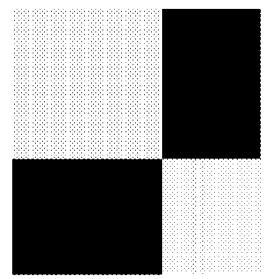

FIG. 8A shows a blur-containing image. FIG. 8B shows an image obtained by performing blur correction for the blur-containing image based on only the opening/closing instruction signal. FIG. 8C shows an image obtained by performing blur correction for the blur-containing image based on the opening/closing instruction signal and exposure characteristic information. Assume that the blur amount corresponds to 20 pixels in conversion into a sensed image during one shooting, as described above.

When generating an exposure pattern, the exposure pattern generation unit 103 generates a blur correction exposure pattern h(t) using not only the opening/closing instruction signal C(t) but also the exposure characteristic information S in consideration of the sensor characteristic. Blur correction is done using the thus-generated exposure pattern h(t).

As described above, according to the first embodiment, a filter for obtaining a high-quality blur-corrected image can be generated by taking into account even exposure characteristic information of the image sensor. By performing blur correction processing using this filter, a blur can be corrected at high precision, as shown in FIG. 8C.

Modification 1 to First Embodiment

A modification to the first embodiment will be described. Note that only a difference of the modification from the first embodiment will be explained. In the first embodiment, one exposure characteristic information corresponds to one "status value indicating the open state" (to be referred to as an effective status value). However, when effective status values are successively aligned in the first time series data, one exposure characteristic information may correspond to a set of successively aligned effective status values. The exposure characteristic information changes depending on the number of successively aligned effective status values, that is, the continuous shutter open time. Thus, the exposure characteristic information save unit 109 needs to store corresponding exposure characteristic information for each number of successively aligned effective status values. This modification will be described below.

The continuous shutter open time is longer when the number of successively aligned effective status values is larger, and shorter when the number is smaller. The exposure characteristic information changes in accordance with the number of successively aligned effective status values. In this modification, the exposure characteristic information save unit 109 stores corresponding exposure characteristic information for each number of successively aligned effective status values.

<Unit Opening/closing of Opening/Closing Instruction Signal>

Unit opening/closing of the opening/closing instruction signal will be explained. A set of successively aligned effective status values in the opening/closing instruction signal will be called "unit opening/closing". In the case of an opening/closing instruction signal in FIG. 10A, each of the first effective status value in the time series order, a set of the fourth and fifth effective status values, and a set of the ninth, 10th, and 11th effective status values serves as unit opening/closing. In FIG. 10A, the first effective status value is defined as unit opening/closing 1, a set of the fourth and fifth effective status values is defined as unit opening/closing 2, and a set of the ninth, 10th, and 11th effective status values is defined as unit opening/closing 3. That is, unit opening/closing indicates a period during which the shutter is open.

As described above, in this modification, the exposure characteristic information save unit 109 stores corresponding exposure characteristic information for each number of successively aligned effective status values. In other words, the exposure characteristic information save unit 109 stores corresponding exposure characteristic information for each unit opening/closing length. In FIG. 10A, unit opening/closing 1 is formed from one effective status value, so the length of unit opening/closing 1 is 1. Similarly, unit opening/closing 2 is formed from two effective status values, and thus the length of unit opening/closing 2 is 2. Unit opening/closing 3 is formed from three effective status values, so the length of unit opening/closing 3 is 3. In this case, the exposure characteristic information save unit 109 stores pieces of exposure characteristic information S corresponding to length 1, length 2, and length 3, as shown in FIG. 10B. The table shown in FIG. 10B schematically represents pieces of exposure characteristic information S which are stored in the exposure characteristic information save unit 109 in correspondence with the respective lengths. This table is created in advance and stored in the exposure characteristic information save unit 109.

<Operation of Exposure Pattern Generation Unit 103>

This modification is different from the first embodiment only in the following point in the flowchart of FIG. 5. In step S205, the exposure pattern generation unit 103 counts the number of successive effective status values (in the time series order) from the opening/closing instruction signal C(x). In FIG. 10A, for x=9, C(9)=C(10)=C(11)=1, and the count value is 3. The exposure pattern generation unit 103 acquires exposure characteristic information S corresponding to the count value from the exposure characteristic information save unit 109, and determines the acquired exposure characteristic information S as a data string corresponding to a set of the xth status value and effective status values successively subsequent to this status value. The exposure pattern generation unit 103 adds the determined data string to the end of an exposure pattern serving as a one-dimensional data string. When the processing in this step is executed for the first time, the exposure pattern is the specified data string itself.

If the process advances from step S205 to step S208 via steps S207, the exposure pattern generation unit 103 increments in step S208 the value of the variable x by the count value obtained in step S205.

In this modification, one exposure characteristic information is held for one unit opening/closing. However, pieces of exposure characteristic information may be held for one unit opening/closing. In this case, one of the pieces of exposure characteristic information is determined based on another exposure characteristic information such as the shutter opening/closing speed.

Modification 2 to First Embodiment

When one exposure characteristic information is assigned to a plurality of effective status values, pieces of exposure characteristic information may be prepared in advance by the number of effective status values, like modification 1, but the exposure characteristic information may be prepared as follows. That is, only one basic exposure characteristic information is prepared in advance, and this exposure characteristic information is processed in accordance with the number of effective status values. More specifically, only exposure characteristic information (basic exposure characteristic information) for the number of effective status values=1 is prepared in advance. When the number of successive effective status values counted in the first time series data is two, new elements are added between elements contained in the basic exposure characteristic information. An element Z to be added between elements X and Y is obtained by interpolation processing using the elements X and Y. In this way, only the basic exposure characteristic information may be held and processed in accordance with the counted number.

Second Embodiment

The second embodiment is different from the first embodiment only in that the charge accumulation characteristic of the image sensor and the shutter opening/closing characteristic of the image sensing device are used as exposure characteristic information. Only a difference of the second embodiment from the first embodiment will be explained. That is, the remaining part is the same as that in the first embodiment.

<Shutter Opening/Closing Characteristic>

The shutter opening/closing characteristic will be explained. The shutter opening/closing characteristic is a shutter opening area until the shutter is opened from a closed state (or vice versa), or a physical characteristic from which the shutter opening area can be obtained.

Figure 9:
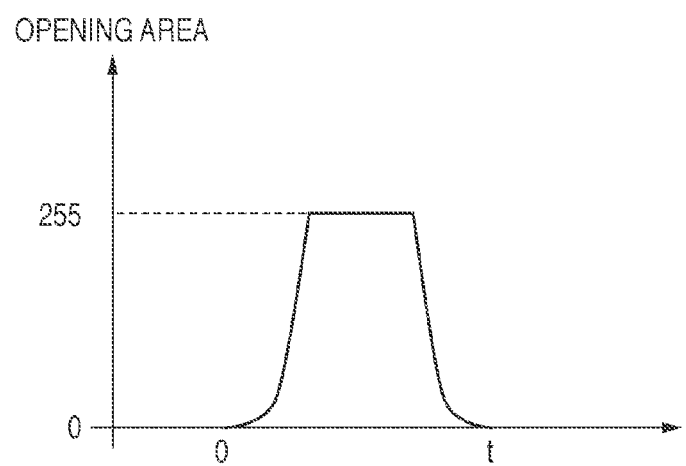
FIG. 9 is a graph showing a temporal change of a shutter opening area O(t)

FIG. 9 is a graph showing a temporal change of a shutter opening area O(t). The abscissa indicates the time, and the ordinate indicates the value of the shutter opening area O(t). O(t)=255 when the shutter is fully open, and O(t)=0 when it is fully closed. For descriptive convenience, an O(t) value in the full open state of the shutter is 255, and an O(t) value in the full closed state is 0. However, other values are also available.

Assume that time series data (third time series data) when opening areas in every 2 msec are listed in the opening/closing characteristic of FIG. 9 is O(t)=[0, 32, 255, 255, 32, 0]. This time series data is obtained by arranging, in the time series order, numerical values each indicating a shutter opening area in every 2 msec until the shutter is opened from the closed state and then closed again. At this time, the shutter is fully opened in 4 msec from the closed state, and similarly closed in 4 msec from the full open state.

In other words, the third time series data is the following time series data. That is, the third time series data is time series data obtained by arranging, in the time series order, numerical values each indicating a shutter opening area measured in advance at every specific timing until the shutter is fully opened from the closed state and then closed again.

<Operation Principle of Exposure Pattern Generation Unit 103>

The second embodiment is different from the first embodiment only in the following point in the flowchart of FIG. 5. In step S202, an exposure pattern generation unit 103 acquires, as exposure characteristic information, the numerical value string S (in the first embodiment, [0, 178, 242, 252, 12, 0]) of accumulated charge amounts, and the time series data O(t) of the opening area (fourth acquisition).

In step S205, the exposure pattern generation unit 103 determines the product of the numerical value string S of accumulated charge amounts and the time series data O(t) of the opening area as a data string S' corresponding to the opening/closing instruction signal C(x). For example, for the numerical value string S of accumulated charge amounts=[0, 178, 242, 252, 12, 0] and the time series data O(t) of the opening area=[0, 32, 255, 255, 32, 0], the data string S' is given by $$S'=S\times O'(t)=[0\times 0, 178\times 32, 242\times 255, 252\times 255, 12\times 32, 0\times 0]=[0, 5696, 61710, 64260, 384, 0]$$

To execute this calculation, the number of numerical values in the numerical value string S and that of numerical values in the time series data O(t) of the opening area need to be equal to each other. The exposure pattern generation unit 103 adds the determined data string S' to the end of an exposure pattern serving as a one-dimensional data string. As a matter of course, when the processing in this step is executed for the first time, the exposure pattern is the specified data string itself.

!!! Since C(1)=1 in FIG. 6, a data string corresponding to C(1) is S'. Therefore, the exposure pattern h(1)=0, h(2)=5696, h(3)=61710, h(4)=64260, h(5)=384, h(6)=0.

!!! For the opening/closing instruction signal C(t)=[1, 1, 0, 1, 0, 1], S=[0, 178, 242, 252, 12, 0], and O(t)=[0, 32, 255, 255, 32, 0], the above processing yields an exposure pattern h(t):

h(t)=[0, 5696, 61710, 64260, 384, 0,
0, 5696, 61710, 64260, 384, 0,
0, 0, 0, 0, 0, 0,
0, 5696, 61710, 64260, 384, 0,
0, 0, 0, 0, 0, 0,
0, 5696, 61710, 64260, 384, 0]

That is, the fourth time series data is calculated such that the product of the ith status value in the time series order in the numerical value string S and the ith numerical value in the time series order in the time series data O(t) of the opening area serves as the ith element in the time series order. In this case, i is an integer which takes a value within the range of 1 (inclusive) to an element count (inclusive) in the numerical value string S (time series data O(t)). A data string corresponding to an effective status value is defined as the fourth time series data.

When each of S and O(t) is represented by a numerical value of 0 to 255, a deconvolution unit 105 needs to divide, by 255×255, the pixel value of each pixel which forms a blur-corrected image, and then output the result. Note that the second embodiment adopts two kinds of exposure characteristic information each divided by 256, but may employ a combination of other division numbers. The division number need not be an integer. Since the exposure pattern is created using two kinds of exposure characteristic information each divided by 256, the exposure pattern h(t) is desirably divided by 255×255. However, the division number is arbitrary.

As described above, according to the second embodiment, a filter for obtaining a high-quality blur-corrected image can be generated using an exposure pattern which considers the charge accumulation characteristic of the sensor and the opening/closing characteristic of the shutter. By performing blur correction processing using this filter, a blur can be corrected at high precision.

Third Embodiment

The functional arrangement of a correction unit 100 in an image sensing device according to the third embodiment will be exemplified with reference to FIG. 11. The arrangement shown in FIG. 11 is configured by adding an opening/closing instruction signal control unit 500 to the arrangement shown in FIG. 1.

The opening/closing instruction signal control unit 500 controls an opening/closing instruction signal setting unit 400 to change an opening/closing instruction signal to be transmitted to an image sensing unit 200 and exposure pattern generation unit 103 in accordance with the contents of exposure characteristic information to be read out from an exposure characteristic information save unit 109 in shooting.

For example, the exposure characteristic information may change depending on the shooting conditions, shutter opening/closing speed, or the like. At this time, the opening/closing instruction signal control unit 500 instructs the opening/closing instruction signal setting unit 400 about an opening/closing instruction signal optimum for the exposure characteristic information. Upon receiving the instruction from the opening/closing instruction signal control unit 500, the opening/closing instruction signal setting unit 400 changes an opening/closing instruction signal to be transmitted to the image sensing unit 200 and exposure pattern generation unit 103.

Modification to Third Embodiment

Figure 12:
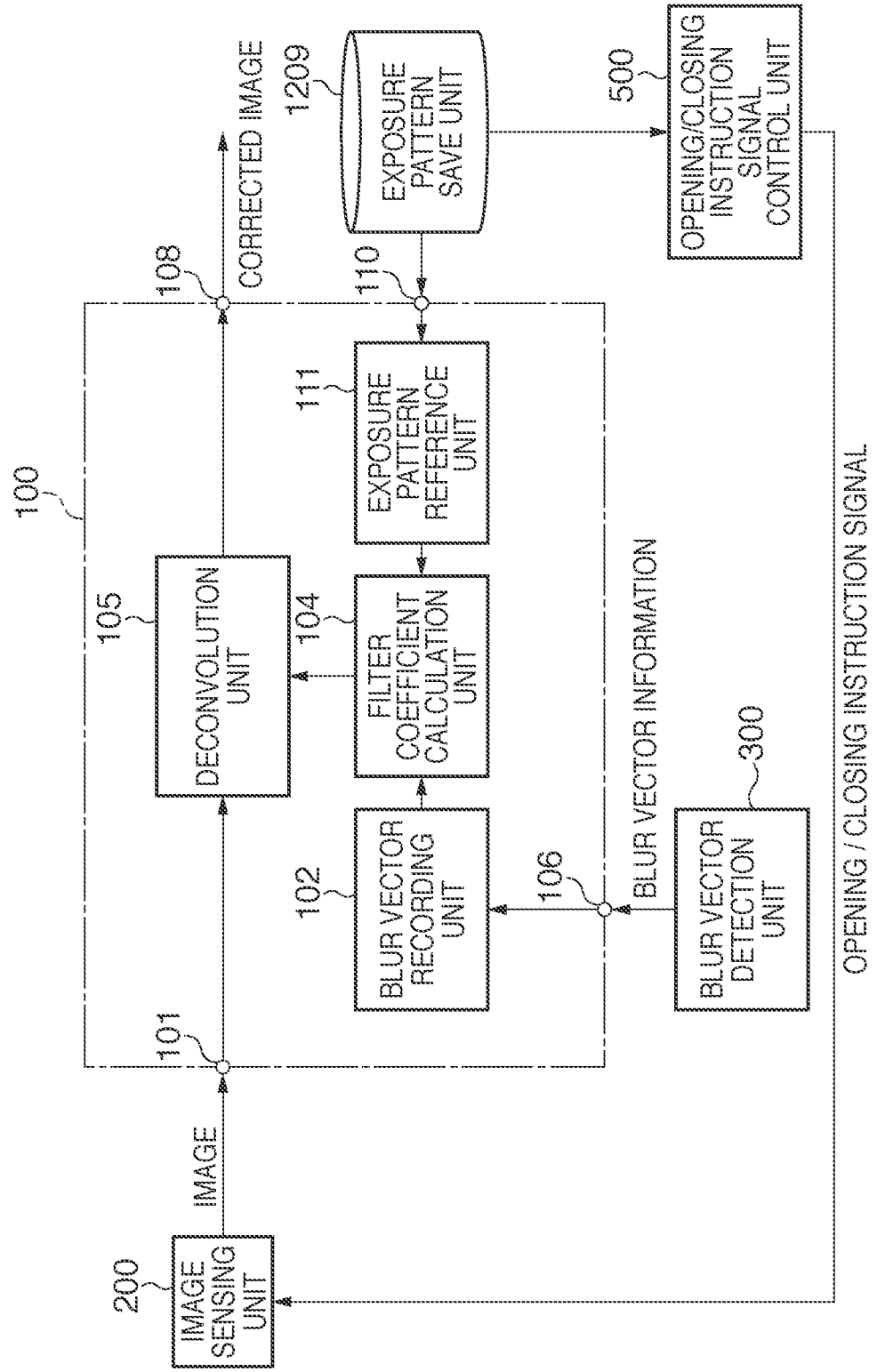
FIG. 12 is a block diagram exemplifying the functional arrangement of an image sensing device.

In the above embodiment, the exposure pattern generation unit 103 calculates an exposure pattern in shooting based on exposure characteristic information from the exposure characteristic information save unit 109 and an opening/closing instruction signal from the opening/closing instruction signal setting unit 400. However, instead of calculating an exposure pattern in every shooting, a calculated exposure pattern may be held in advance, and if necessary, referred to by an exposure pattern reference unit 111. FIG. 12 exemplifies the functional arrangement of an image sensing device in this case. The exposure pattern reference unit 111 transmits an exposure pattern saved in an exposure pattern save unit 1209 to the filter coefficient calculation unit 104, as needed. Even the opening/closing instruction signal is held in the exposure pattern save unit 1209, and if necessary, read out by the opening/closing instruction signal control unit 500 and transmitted to the image sensing unit 200.

The operation of the correction unit 100 in the modification to the third embodiment will be described with reference to the flowchart of FIG. 13. In particular, a difference from FIG. 2 will be explained. FIG. 13 is different from FIG. 2 in reference of the exposure pattern in step S1302. That is, steps S1301 and S1303 to S1306 are the same as S101 and S103 to S106 in FIG. 2. In step S1302, the exposure pattern reference unit 111 refers to an appropriate exposure pattern based on the shooting conditions, and transmits it to the filter coefficient calculation unit 104.

<Held Contents of Exposure Pattern>

The contents of an exposure pattern that are saved in the exposure pattern save unit 1209 will be explained with reference to FIGS. 14A and 14B. As the exposure pattern, a plurality of exposure patterns are saved in accordance with the shooting conditions such as the shutter speed and stop, as shown in the tables of FIGS. 14A and 14B. The table of FIG. 14A shows an exposure pattern save example for a mechanical shutter. The table of FIG. 14B shows an exposure pattern save example for an electronic shutter. For example, for a shutter speed of 1/250 sec in a camera having a mechanical shutter, exposure pattern information (exposure pattern described at the top) corresponding to an index "1" in FIG. 14A is used. Note that the exposure pattern cited here is merely an example. The number of exposure patterns suffices to be one, or the exposure pattern may be based on conditions other than the shutter speed and stop.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-126292, filed Jun. 1, 2010 and 2011-061345 filed Mar. 18, 2011, which are hereby incorporated by reference herein in their entirety.

What is claimed is:

1. An image processing apparatus comprising:
a first acquisition unit configured to acquire sensed image data obtained by controlling opening/closing of a shutter based on a signal for controlling an opening/closing timing of the shutter of an image sensing device;
a second acquisition unit configured to acquire exposure characteristic data indicating an exposure characteristic of the image sensing device in unit opening/closing of the shutter;
a third acquisition unit configured to acquire a motion vector regarding an image represented by the sensed image data when acquiring the sensed image data; and
a correction unit configured to correct the image represented by the sensed image data based on the signal for controlling the opening/closing timing of the shutter, the exposure characteristic data, and the motion vector.

2. The apparatus according to claim 1, wherein the shutter of the image sensing device is one of an electronic shutter and a mechanical shutter.

3. The apparatus according to claim 1, further comprising a generation unit configured to generate, based on the signal for controlling the opening/closing timing of the shutter and the exposure characteristic data, an exposure pattern when obtaining the sensed image data.

4. An image processing apparatus comprising:
a first acquisition unit configured to acquire sensed image data obtained by controlling opening/closing of a shutter based on a signal for controlling an opening/closing timing of the shutter of an image sensing device;
a second acquisition unit configured to acquire exposure characteristic data indicating an exposure characteristic in a plurality of opening/closing operations of the shutter;
a third acquisition unit configured to acquire a motion vector regarding an image represented by the sensed image data when acquiring the sensed image data; and
a correction unit configured to correct the image represented by the sensed image data based on the signal for controlling the opening/closing timing of the shutter, the exposure characteristic data, and the motion vector.

5. An image processing method comprising:
a first acquisition step of acquiring sensed image data obtained by controlling opening/closing of a shutter based on a signal for controlling an opening/closing timing of the shutter of an image sensing device;
a second acquisition step of acquiring exposure characteristic data indicating an exposure characteristic of the image sensing device in unit opening/closing of the shutter;
a third acquisition step of acquiring a motion vector regarding an image represented by the sensed image data when acquiring the sensed image data; and
a correction step of correcting the image represented by the sensed image data based on the signal for controlling the opening/closing timing of the shutter, the exposure characteristic data, and the motion vector.

6. An image processing method comprising:
a first acquisition step of acquiring sensed image data obtained by controlling opening/closing of a shutter based on a signal for controlling an opening/closing timing of the shutter of an image sensing device;
a second acquisition step of acquiring exposure characteristic data indicating an exposure characteristic in a plurality of opening/closing operations of the shutter;
a third acquisition step of acquiring a motion vector regarding an image represented by the sensed image data when acquiring the sensed image data; and
a correction step of correcting the image represented by the sensed image data based on the signal for controlling the opening/closing timing of the shutter, the exposure characteristic data, and the motion vector.

* * * * *